United States Patent [19]

Stokes et al.

[11] Patent Number: 5,687,301
[45] Date of Patent: Nov. 11, 1997

[54] FIELD CORRECTION OF APPLICATION SPECIFIC PRINTER DRIVER PROBLEMS

[75] Inventors: DeVerl N. Stokes, Eagle; Terry P. Mahoney, Boise, both of Id.

[73] Assignee: Hewlett-Packard Company, Palo Alto, Calif.

[21] Appl. No.: 528,589

[22] Filed: Sep. 15, 1995

[51] Int. Cl.⁶ .................................................. G06K 15/00
[52] U.S. Cl. .................................................. 395/112; 395/114
[58] Field of Search ................................... 395/112, 114, 395/101, 109, 500, 115, 200.2, 200.18, 828, 834, 882, 892, 347, 975, 970, 967, 354, 116, 831, 835, 837, 838, 884, 110, 111, 113; 400/61, 62, 63, 64, 65, 67, 70, 71, 76; 358/407, 467, 468; 364/188

[56] References Cited

U.S. PATENT DOCUMENTS

| 5,228,118 | 7/1993 | Sasaki | 395/112 |
| 5,579,446 | 11/1996 | Naik et al. | 395/109 |
| 5,580,177 | 12/1996 | Gase et al. | 400/61 |
| 5,604,843 | 2/1997 | Shaw et al. | 395/114 |

FOREIGN PATENT DOCUMENTS 2226327   9/1990   Japan.

OTHER PUBLICATIONS

Alan Simpson; "Mastering Word Perfect 5.1 & 5.2 for Windows"; Date 1993; Pp. 296–297 and 1126.

Primary Examiner—Edward L. Coles, Sr.
Assistant Examiner—Dov Popovici
Attorney, Agent, or Firm—Anthony J. Baca

[57] ABSTRACT

The present invention allows for field changes of the function of a print driver based on the application requesting print driver services. First, a utility is activated. Using the utility, the application is selected and a flag is set that indicates the problem function. The flag and information about the associated application are stored in a data structure. Finally, the data structure is stored in a storage device. When the application requests services of the printer driver, all the data structures are scanned looking for an entry for the requesting application. If an entry is found, then the function flag is used to direct a change in the function of the printer driver. If an entry is not found, then a permanent list is searched for an entry of the application. Again, if an entry is found in the permanent list it is used to direct a change in the function of the printer driver.

1 Claim, 3 Drawing Sheets

FIELD CORRECTION OF APPLICATION SPECIFIC PRINTER DRIVER PROBLEMS

TECHNICAL FIELD

The present invention relates to printer drivers, and more particularly to a method apparatus for field correction of printer drivers to allow for proper handling of special need applications discovered after the printer driver has been released.

BACKGROUND OF THE INVENTION

The most widely used operating system in desk top computers are DOS (Disk Operating System) and Windows, both products of the Microsoft Corporation, Redmond, Wash. The DOS operating system requires that applications include an embedded printer driver module that enables communications with a connected printer. An application, therefore, must have embedded in it an appropriate printer driver for a connected printer. If two or more printers of different kinds are connected to a computer having a DOS applications, each application requiring use of the printers must include embedded printer drivers for each printer type. By contrast, the Windows operating system employs separate printer driver modules and all applications written for a Windows Operating System are enabled to employ a printer driver module in a generic manner. Thus, Windows applications have a standard interface that matches the pre-existing printer driver module. If a computer is required to interface with two or more different types of printers, each requiring a separate printer driver, the windows operating system requires a printer driver module for each of the different type printers.

Occasionally, a conflict between a printer driver module and a windows application may result in unexpected output on the printer. The printer driver module can be configured to do special things for those special need applications known prior to the release of the printer driver module. Most printer drivers hardcode these actions into the driver itself, then when a special need applications starts printing, the driver changes its functionality in some areas to accommodate the requirements of this application.

Hardcoding of these special cases requires a foreknowledge of the particular special cases prior to releasing the printer driver module for general use. However, occasionally after a driver has been released for general use, a special need application is identified in the field. Prior to the present invention, there was no way, short of releasing a new printer driver module, that these newly discovered special need applications could be corrected in the field.

SUMMARY OF THE INVENTION

The present invention is a method and system for changing a function of a print driver for an application. In order to accomplish the method of the present invention first, a utility is activated. Using the utility, the application is selected and a flag is set that indicates the problem function. The flag and information about the associated application are stored in a data structure. Finally, the data structure is stored in a storage device.

When the application requests services of the printer driver, all the data structures are scanned looking for an entry for the requesting application. If an entry is found, then the function flag is used to direct a change in the function of the printer driver. If an entry is not found, then a permanent list is searched for an entry of the application. Again, if an entry is found in the permanent list it is used to direct a change in the function of the printer driver.

The present invention operates in a system including a host computer and a printer connected to the host computer. An application allows the host computer to perform a task. Applications communicate with the printer through a printer driver. There is a utility for indicating to the host computer that the application requires special handling by the printer driver. The host includes a permanent storage device for storing the indication when the host computer is powered off. Local memory is used by the host computer to store information while the host computer is powered on.

When the application requests services of the printer driver, the local memory is scanned looking for an entry for the present application. If the scanning finds an entry, then a function of the printer driver is changed to accommodate the application.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

Figure 1:
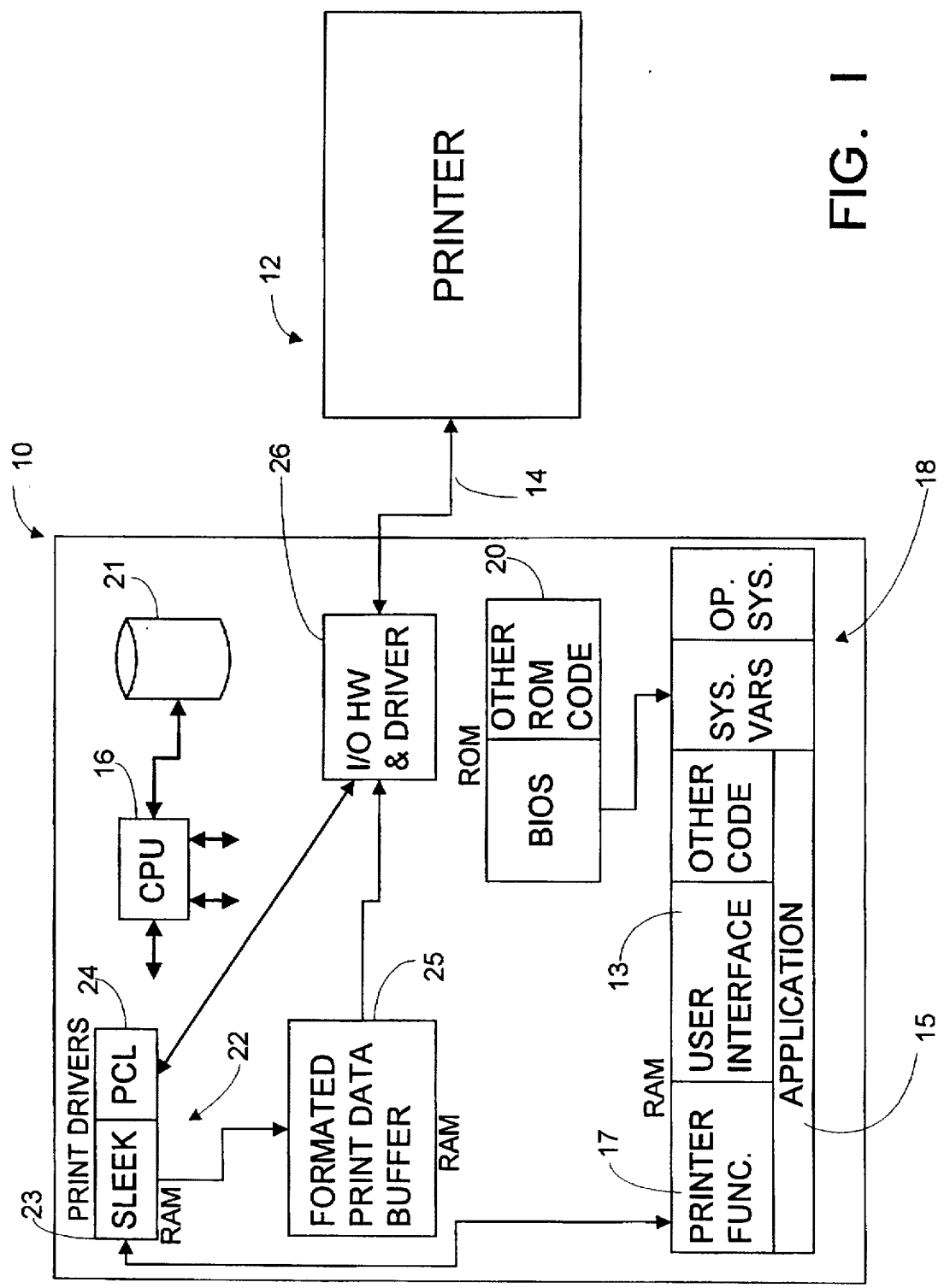
FIG. 1 is a block diagram showing internal aspects of a host computer.

The present invention is not limited to a specific embodiment illustrated herein. Referring particularly to FIG. 1, a host computer 10 is connected to a printer 12 via a standard I/O interface 14. For the purposes of this description, it will be assumed that host computer 10 is a personal computer. An understanding of the internal workings of printer 12 is not necessary to understand the present invention.

Host computer 10 includes a central processing unit 16 and a random access memory (RAM) that is segmented into a number of portions. RAM portion 18 contains software code for controlling the host computer's application 15, printer driver functions 17, and a user interface 13. RAM portion 18 also includes system variables and the host's operating system. A read only memory (ROM) 20 includes firmware for controlling the basic input/output system (BIOS) and code for controlling other host functions. RAM portion 22 includes print driver software for enabling host computer 10 to operate in either a Sleek mode 23 or a PCL mode 24. In this case, PCL means "Printer Control Language" which is a standard, widely-used driver for printers. It will be understood by one skilled in the art that the present invention is not limited to a particular language or number of languages. A further portion 25 of RAM is set aside to act as a buffer to contain raster image data that has been formatted by Sleek driver 23 and is ready for transfer to laser printer 12 via I/O hardware and driver module 26. There is also shown an storage media 21, which includes a hard disk drive and a removable floppy disk drive.

Figure 2:
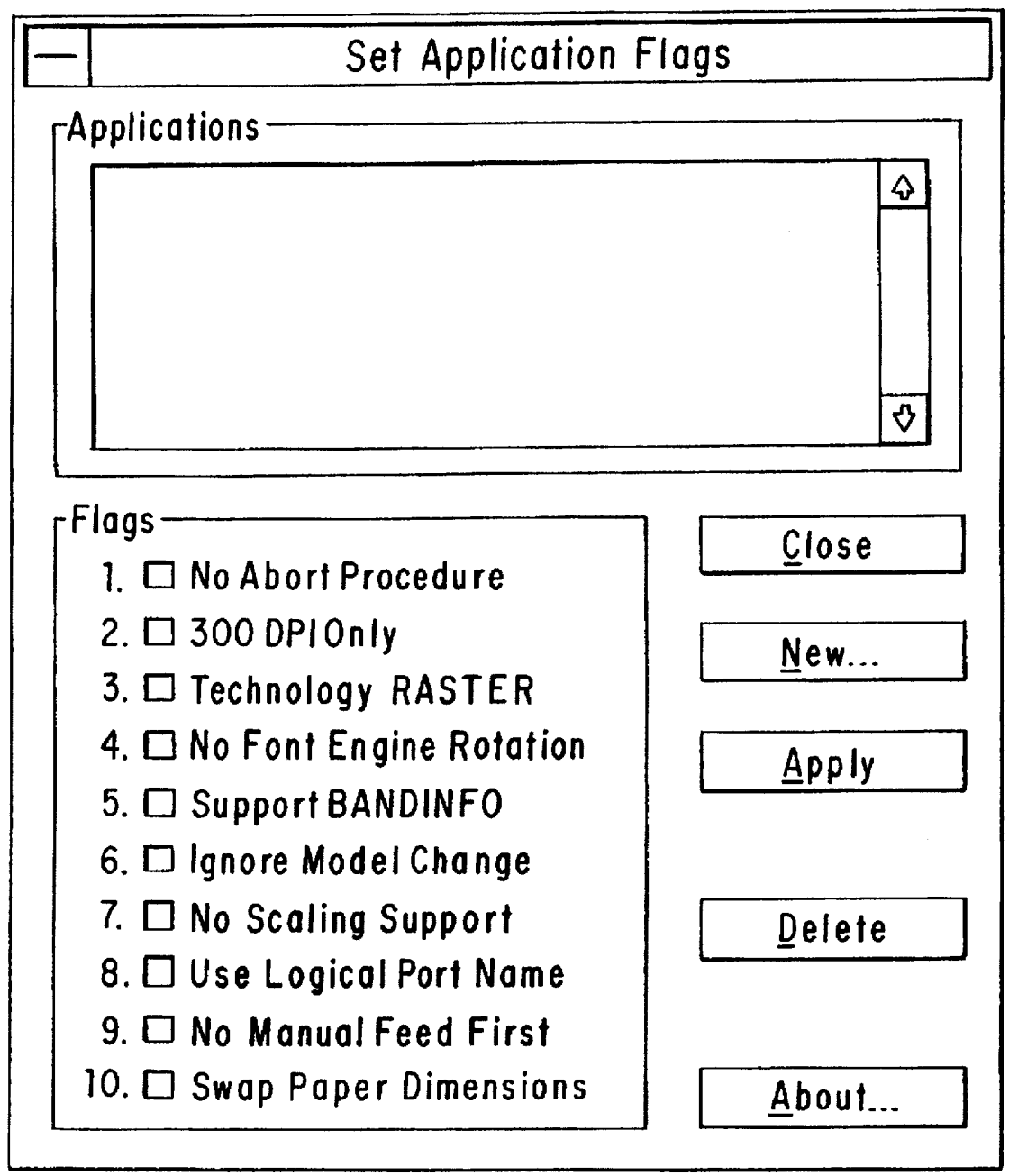
FIG. 2 shows the AppFlag utility user interface.

Referring particularly to FIG. 2, the preferred embodiment of the present invention provides the ability to "special case" an application 15 in the field. This special treatment is applied on an application by application basis using a password protected utility. In the preferred embodiment, the list of application flags that can be applied is quite small, but covers a wide range of printing problems, including all of the special need applications that were identified prior to the release of the printer driver module.

A password is required to start the utility, thereby reducing the likelihood of inadvertent use. The field user executes the utility in the normal manner, supplying the password when requested. Once the utility is started, the user is presented with an application flag user interface 13 as shown in FIG. 2. To special case an application 15, the user presses the "NEW" button, which brings up the standard file open dialog box. Next, the user locates the application file which is causing the problems, highlights it, and presses OK. The "AppFlag" utility verifies that this is executable program, locates the programs internal module name, locates the version resource information in the file, if present, and displays the module name and version information in the list box. An entry is made in the AppFlag database 21 that contains the module name, the version number, a number representing the current operating system, and an AppFlag entry of zero. The zero entry signifies that no AppFlags are currently set for this application. To set an AppFlag for an application 15, the user first selects it in the list box and clicks the appropriate check box. Any changes that are made are not saved in the database 21 until the apply button is pressed.

Referring now in more detail to FIG. 2 where the AppFlag user interface is shown. In the preferred embodiment, the user may select from 10 flags. One skilled in the art will understand that these 10 flags are only representative of the most common problems presently identified. Flag number 1, labeled "No Abort Procedure", signifies that this application 15 does not use an abort procedure. Flag 2, labeled "300 DPI only", forces the printer driver 22 to always print at 300 dpi for this specified application. Refer now to Flag number 3 named "Technology=Raster". Flag 3 causes the printer driver 22 to report its printing technology as raster to the specified application 15. Flag 4 is named "No Font Engine Rotation". Setting this flag disables the printer driver 22 from performing text rotation, forcing the application 15, or most likely the video driver, to do the text rotation for the printer driver 22. Flag 5, "support bandinfo", causes the printer driver 22 to support the "obsolete" bandinfo printer escape. Flag 6, "ignore model change", signifies that some applications handle the PDEVICE structure (a data structure used by the printer driver and maintained by the GDI) incorrectly, resulting in a portion of it being discarded. This loss of data causes the printer driver 22 to believe that the configuration is incorrect and informs the user that they must reinstall the printing software. With this flag set, the printer driver 22 ignores this condition and uses default values for the missing data. Flag 7, "no scaling support", forces the printer driver 22 to report to the application 15 that it is incapable of performing scaling. Flag 8, "use logical port name" signifies that the application 15 will use the logical port name as opposed to the literal port name. Flag 9, "no manual feed first", forces the printer driver 22 to make sure that "manual feed" is never the first bin name reported to an application 15. Finally, Flag 10, "swap paper dimensions", corrects a misunderstanding between the printer driver 22 and application 15 on paper dimensions, The printer driver, as previously described, has a hardcoded list of those known applications needing special handling. In the preferred embodiment, this list is stored in an array of the data structures defined by the following:

```
typedef struct {
    LPSTR       lpModuleName;
    DWORD       dwFileVersionMS;
    DWORD       dwFileVersionLS;
    DWORD       dwOSValid;
    DWORD       dwAppFlags;
} APPFLAG_INFO, Far *LPAPPFLAG_INFO;
```

A representative sample of the hardwired list is shown here:

```
{ "EXCEL",
    APPFLAG_ALL_VERSIONS,
    APPFLAG_ALL_VERSIONS,
    APPFLAG_OS_ALL, APPFLAG_NODMSCALESUPPORT |
APPFLAG_NOROTENGREALIZE },
{ "CALENDAR",
    APPFLAG_ALL_VERSIONS,
    APPFLAG_ALL_VERSIONS,
    APPFLAG_OS_ALL,
    APPFLAG_MAXRES300 },
{ "CARDFILE",
    APPFLAG_ALL_VERSIONS,
    APPFLAG_ALL_VERSIONS,
    APPFLAG_OS_ALL,
    APPFLAG_MAXRES300},
{ "MSVC",
    APPFLAG_ALL_VERSIONS,
    APPFLAG_ALL_VERSIONS,
    APPFLAG_OS_W3X,
    APPFLAG_NOABORTPROC },
```

In the preferred embodiment, the printer driver 22 has access to an external database 21, in addition to the above hardcoded list. The external database 21 is maintained by the AppFlag utility as described above.

When an application 15 requests any service of the printer driver 22, 17, the printer driver 22 determines if any special needs have been identified for the application 15 by issuing a call to the SetupAppFlags() function by using, for example, the following line of code:

lpdv→dwAppFlags=SetupAppFlags ()

This function returns a value containing a bit mapped description of all of the special needs (if any) of the application 15 that requested the printer driver 22 services. The behavior of the printer driver 22 is modified if a specific bit is set in the result.

Figure 3:
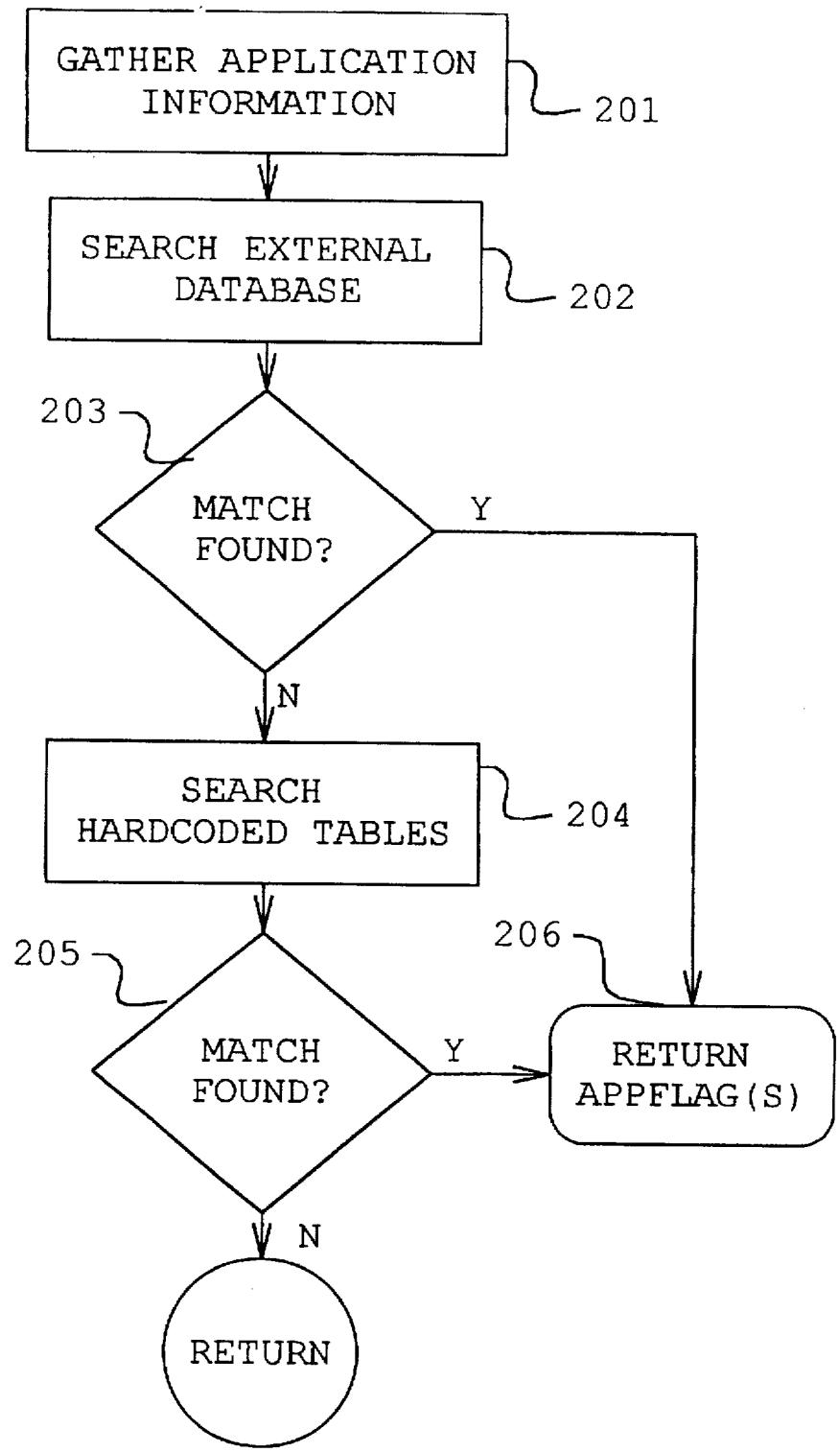
FIG. 3 is a logical flow diagram of the SetupAppFlags() function.

Referring now to FIG. 3, the SetupAppFlags() function first gathers information 201 about the application 15 that is requesting printer driver 22 services. Gathered information includes the internal module name, full path name of the executable file, and version numbers of the application. Next, the AppFlag database is searched 202 to determine if any special needs applications have been setup by the AppFlag utility. A match 203 is determined by comparing the module names, version numbers, and the operating system specified in the AppFlag. If a match is found 206 in the external AppFlag database 21, the AppFlags for the application 15 are returned.

If a match is not found in the external AppFlag database 21, the AppFlags hardcode table is searched 204. Flags for each matching application 15 (there may be multiple for a specific application and version number combination) are bitwise ORed together to form the result 206.

By searching the external database 21 first and stopping the search if a match is found, the hardcoded AppFlags can be overridden in the field without modifying the printer driver 22 code.

All accesses to the external database 21 is through an instantiation (an object) of the DCustAppFlags class. The declaration of the DCustAppFlags class is shown below:

```
typedef struct APPINFOARR {
             char         szModule(10);
             APPFLAG_INFO ai;
} APPINFOARR, FAR *LPAPPINFOARR;
class DCustAppFlags {
public:         // Construction / Destruction.
                DCustAppFlags( );
                ~DCustAppFlags( );
public:         // Public data.
public:         // Operation.
                int Refresh( );
                int GetCount( ) { return m_nElems; }
                LPAPPFLAG_INFO operator [ ] ( int index );
                LPAPPFLAG_INFO GetAIPtr( LPSTR lpszModule );
protected:      // Hidden data.
                int          m_nElems;
                LPAPPINFOARR m_lpArr;
protected:      // Hidden operations.
                int Load ( );
                void Unload( );
protected:      // Protected helper operations.
                LPSTR AllocStrPtr ( DWORD dwsize );
                LPAPPINFOARR AllocAppInfoArray( int num );
                BOOL GetAppFlagIniEntry (LPCSTR lpszItem,
APFLAG_INFO & appInfo);
                BOOL IsHexValuse( char c);
                int HexValue( char c );
                DWORD str2dw( char *str );
                int GetItemNames(LPSTR lpszBuf, int nBufSize );
};
```

The printer driver 22 instantiates an object of this class with a statement like the following:

DCustAppFlags custAppFlags

An object of this class, upon instantiation, loads all of the AppFlags from the external AppFlag database 21 into memory 18. This provides for rapid response when the printer driver 22 performs a search. A search is performed whenever a call is made to the SetupAppFlag() function, as described above. It was mentioned that the external AppFlag database 21 is checked first. This is done in SetupAppFlag() by invoking the GetAIPtr() member function of the custAppFlags object. This member function searches its internal AppFlag database and returns a pointer to the APPFLAG_INFO structure if a match is found.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for changing a function of a printer driver, said method comprising the steps of:

activating a utility;

selecting an application through said utility;

indicating said function by setting a function flag;

associating said function flag with said application in a data structure;

storing said data structure in a storage means;

detecting when said application requests services of said printer driver;

reading said data structure from said storage means first searching said data structure for said function flag associated with said application;

if said step of first searching finds said function flag associated with said application, then
retrieving said function flag;
using said function flag to direct a change in said function of said printer driver;

if said step of first searching fails to find said function flag associated with said application, then
second searching a hardcoded list for an entry associated with said application; and
if said step of second searching finds said entry, then allowing said entry to direct a change in said function of said printer driver.

* * * * *